US008133422B2

(12) United States Patent  
Beauseigneur et al.

(10) Patent No.: US 8,133,422 B2
(45) Date of Patent: Mar. 13, 2012

(54) ALKYLCELLULOSE SALT BINDER FOR GREEN BODY MANUFACTURE

(75) Inventors: Patricia Ann Beauseigneur, Radford, VA (US); Kevin Ying Chou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 652 days.

(21) Appl. No.: 12/261,429

(22) Filed: Oct. 30, 2008

(65) Prior Publication Data

US 2010/0113249 A1 May 6, 2010

(51) Int. Cl.
| B29C 47/00 | (2006.01) |
| B29C 47/12 | (2006.01) |
| C08L 1/26  | (2006.01) |
| C08L 5/00  | (2006.01) |
| C09D 101/26 | (2006.01) |
| C09D 105/00 | (2006.01) |

(52) U.S. Cl. ............ 264/177.12; 264/176.1; 106/162.8; 106/162.82

(58) Field of Classification Search ............... 106/162.1, 106/162.8, 162.82; 264/199; 501/80, 81, 501/85
See application file for complete search history.

(56) References Cited

U.S. PATENT DOCUMENTS

| 5,620,637 A * | 4/1997 | Kaga et al. | 264/681 |
| 6,359,769 B1 * | 3/2002 | Mushiake et al. | 361/502 |
| 6,387,480 B1 * | 5/2002 | Komada et al. | 428/316.6 |
| 6,444,597 B1 * | 9/2002 | Sato et al. | 501/20 |
| 6,933,255 B2 * | 8/2005 | Beall et al. | 501/128 |
| 2008/0142149 A1 * | 6/2008 | Noguchi et al. | 156/89.22 |

FOREIGN PATENT DOCUMENTS

WO WO-2006/035674 A1 * 4/2006

OTHER PUBLICATIONS

L. Li et al., "Thermally Induced Association and Dissociation of Methylcellulose in Aqueous Solutions", *Langmuir*, 2002, vol. 18, pp. 7291-7298.
N. Sarkar, et al., "Methylcellulose Polymers as Multifunctional Processing Aids in Ceramics", *Ceramic Bulletin*, 1983, vol. 62, p. 1280.
N. Sarkar, "Thermal gelation properties of methyl and hydroxypropyl methylcellulose", *Journal of Applied Polymer Science*, 1979, vol. 24, pp. 1073-1087.
J.E. Schuetz, "Methylcellulose Polymers as Binders for Extrusion of Ceramics", Ceramic Bulletin, 1986, vol. 65, pp. 1556.
"Methocel Cellulose Ethers Technical Handbook", Dow Chemical Co.

* cited by examiner

*Primary Examiner* — Jerry Lorengo
*Assistant Examiner* — Noah Wiese
(74) *Attorney, Agent, or Firm* — John L. Haack

(57) ABSTRACT

A batch mixture including ceramic-forming ingredients, a pore former, a binder comprising an ammonium salt of an alkylated cellulose binder, and a liquid vehicle, as defined herein. Also disclosed is a method for producing a ceramic precursor article as defined herein having excellent extrusion properties.

9 Claims, 5 Drawing Sheets

Calendar Days

US 8,133,422 B2

ALKYLCELLULOSE SALT BINDER FOR GREEN BODY MANUFACTURE

The entire disclosure of any publication, patent, or patent document mentioned herein is incorporated by reference.

FIELD

The disclosure is generally directed to ceramic-forming batch mixtures with a pore former and to ceramic-forming green bodies with a pore former, and methods for making ceramic bodies.

BACKGROUND

Exhaust gases emitted by internal combustion systems utilizing hydrocarbon fuels, such as hydrocarbon gases, gasoline, or diesel fuel, can cause serious pollution of the atmosphere. Among the many pollutants in these exhaust gases are hydrocarbons and oxygen-containing compounds, the latter including nitrogen oxides ($NO_x$) and carbon monoxide (CO). The automotive industry has, for many years, attempted to reduce the quantities of pollutants from automobile engine systems, the first automobiles equipped with catalytic converters having been introduced in the mid 1970's. Cordierite substrates, typically in the form of a honeycomb body, have long been preferred for use as substrates to support catalytically-active components for catalytic converters on automobiles.

Aluminum titanate (AT) ceramics have emerged as an excellent candidate for high-temperature applications. To achieve the desired porosity in such aluminum titanate materials, graphite pore formers have been added to the inorganic batch materials.

Hydrophobically modified cellulose polymers such as methylcellulose (MC) and hydroxypropyl methylcellulose (HPMC) have been used as binders in automotive substrate and diesel filter ceramic precursor batch compositions. These polymers give the batch the necessary plasticity and green strength in the forming and drying stages to produce high quality honeycomb ware. However, polymers such as MC and HPMC can undergo phase separation and subsequent gelation at a characteristic temperature. At such a temperature the methyl cellulosic polymers lose the water that surrounds the pendant methoxy side groups. This loss of hydration exposes the methoxy groups and enables hydrophobic associations to occur between the methoxy substituents of neighboring chains. This leads to phase separation and ultimately the build up of a long range gel network (refs. 1-5). When the binder undergoes this thermal phase transition within a ceramic precursor batch, the batch becomes stiffer and the extrusion pressure increases significantly which can produce severe defects in the extruded honeycomb structure. The thermal transition behavior of polymers like MC and HPMC can limit the extrusion process of numerous ceramic product lines. The batch temperature increases with feed rate due to increased shear heating in the extruder. Ultimately, throughput reaches a limit as the batch approaches the thermal transition temperature of the binder.

SUMMARY

The disclosure relates to a composition having superior extrusion quality, consistency, onset-of-gelation temperature or batch stiffening temperature, and superior throughput properties in the manufacture of batch mixtures and green bodies for ceramic articles, such as aluminum titanate or cordierite containing honeycomb ceramic articles. In embodiments, the disclosure provides batch mixtures and batch processes for making a ceramic article. The disclosed batch mixtures can provide, for example, enhanced quality and enhanced feed-rates in extrusion.

BRIEF DESCRIPTION OF THE DRAWING(S)

Figure 3:
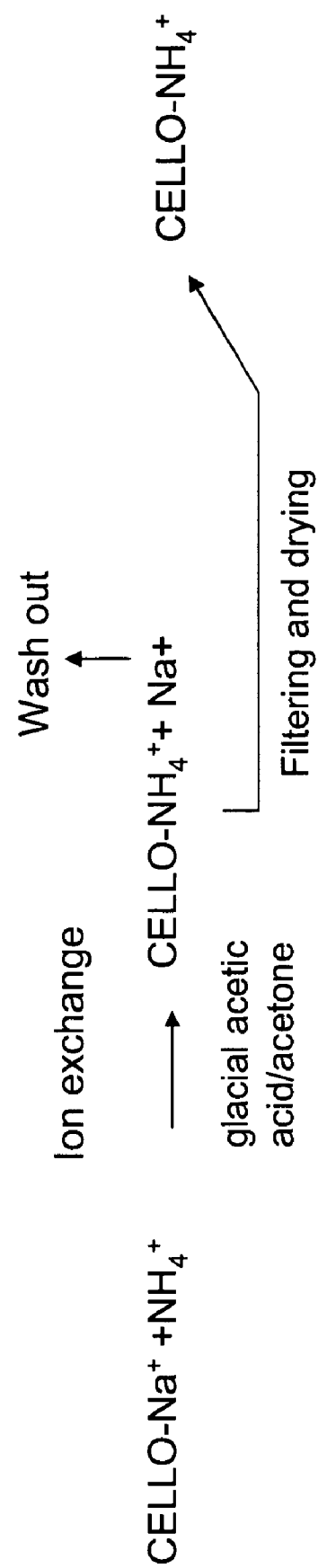

FIG. 3 schematically illustrates an ion-exchange method for reducing Na ions in methylcellulose, in embodiments of the disclosure.

Figure 4:
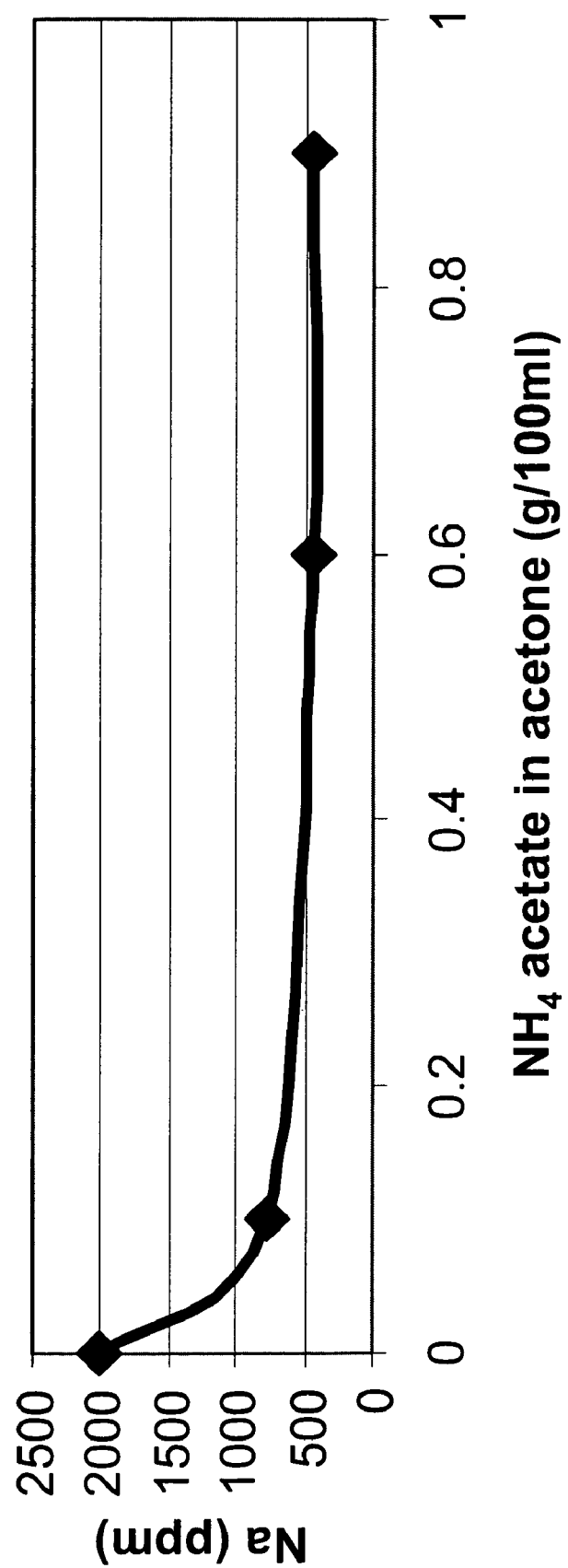

FIG. 4 illustrates observed Na ion levels in methylcellulose after an ion-exchange step as a function of $NH_4^+$ in acetone, in embodiments of the disclosure.

Figure 5:
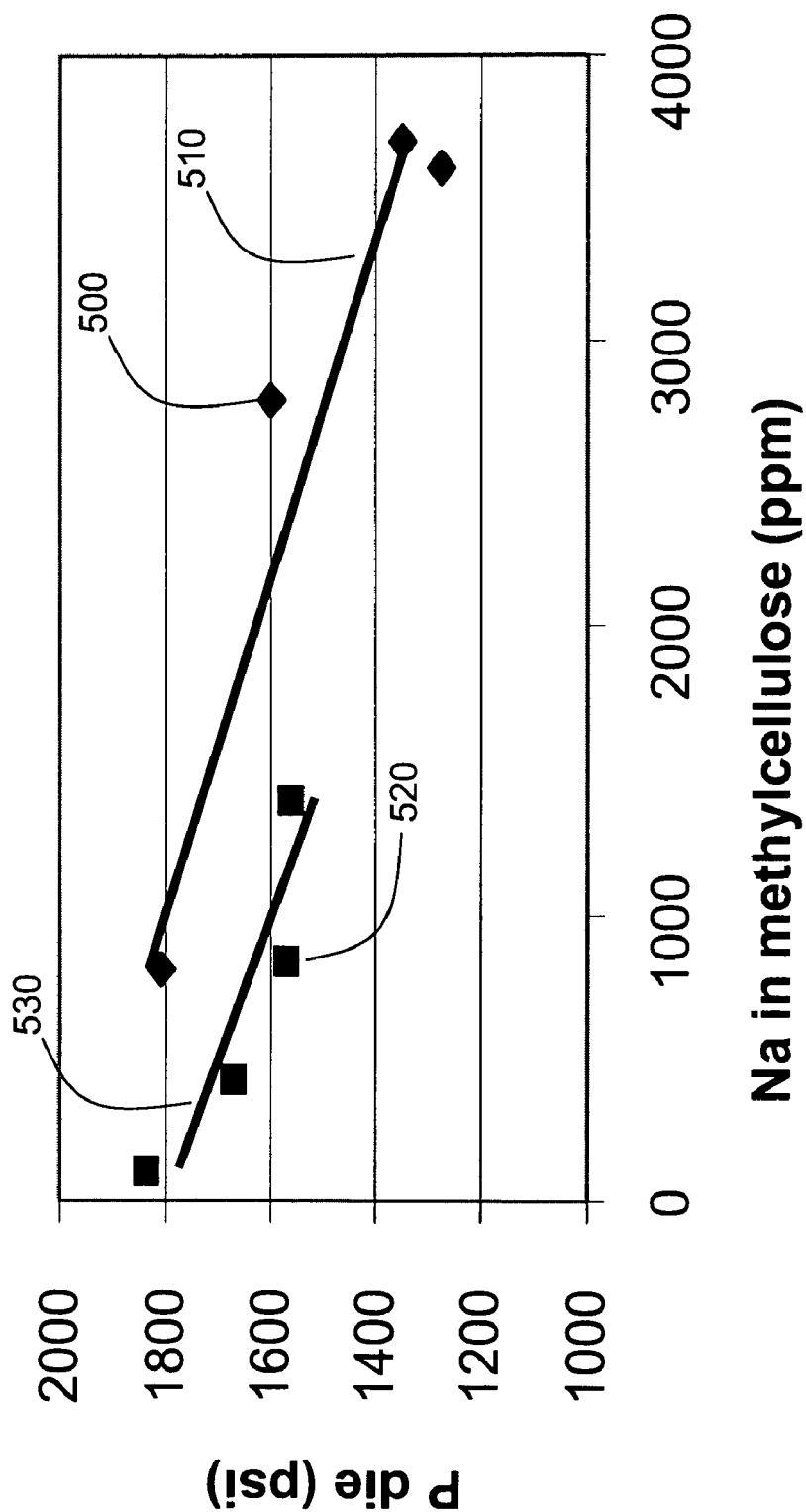

FIG. 5 illustrates observed die pressures versus Na ion content in methylcellulose for untreated and treated pre-ceramic formulations, in embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification merely set forth some of the many possible embodiments for the claimed invention.

Definitions

"Gelation temperature" refers to the temperature at which a batch has stiffened to such an extent that it cannot effectively be extruded.

"$T_{onset}$" refers to the temperature at which the rheology of the batch begins to transition from low to high viscosity.

"Include," "includes," or like terms means including but not limited to, i.e., inclusive and not exclusive.

"About" modifying, for example, the quantity of an ingredient in a composition, concentrations, volumes, process temperature, process time, yields, flow rates, pressures, film thickness, and like values, and ranges thereof, employed in describing the embodiments of the disclosure, refers to variation in the numerical quantity that can occur, for example: through typical measuring and handling procedures used for making compounds, compositions, concentrates or use formulations; through inadvertent error in these procedures; through differences in the manufacture, source, or purity of starting materials or ingredients used to carry out the methods; and like considerations. The term "about" also encompasses amounts that differ due to aging, for example, of a composition or formulation with a particular initial concentration or mixture, and amounts that differ due to mixing or processing a composition or formulation with a particular initial concentration or mixture. Whether modified by the term "about" the claims appended hereto include equivalents to these quantities.

"Consisting essentially of" in embodiments refers, for example, to a batch mixture, green body, or ceramic article manufactured as defined herein; and a method for making or using the batch mixture, green body, or ceramic article as defined herein, and can include the components or steps listed in the claim, plus other components or steps that do not materially affect the basic and novel properties of any of the compositions, articles, apparatus, and methods of making and use of the disclosure, such as particular reactants, particular materials, particular additives or ingredients, particular agents, particular surface modifier or surface conditions, or like structure, material, or process variable selected. Items that may materially affect the basic properties of the components or steps of the disclosure or that may impart undesirable characteristics to the present disclosure include, for example, high graphite pore former content, reduced throughput volume or increased throughput time in extrusion, drying, firing, or like operations, and like characteristics.

Thus, the claimed invention may suitably comprise, consist of, or consist essentially of, for example, a batch mixture, green body, or ceramic article manufactured as defined herein; and a method for making or using the batch mixture, green body, or ceramic article as defined herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, reactants, and like aspects, and ranges thereof, are for illustration only; they do not exclude other defined values or other values within defined ranges. The compositions, apparatus, and methods of the disclosure include those having any value or any combination of the values, specific values, more specific values, and preferred values described herein.

A major issue encountered with the extrusion of ceramic batch materials is related to extrusion stability or instability, which can manifest itself, for example, as an inconsistent process window in extrusion runs or screen plugging. Improved process control and equipment can address many of these issues. However, raw material related upsets are difficult to prevent and can cause increased production cost. For example, material interactions between various ingredients or additives with other raw materials can be unpredictable. Consequently, there is a desire to minimize the sensitivity of binders such as methylcellulose to minor changes in raw materials and to develop a more robust binder system that can make ceramic batch extrusions more consistent and predictable for manufacturing.

It has been discovered that when the sodium level is higher than about 2,800 ppm Na (or about 0.6 weight % NaCl) in the methylcellulose binder the extrusion begins to exhibit instability. This instability manifests itself, for example, as unexpected pressure in extrusion processing or in high screen plugging. In embodiments, the disclosure provides an ion-exchange technique which reduces the sodium level in methylcellulose binders so that a high (e.g., greater than about 2,800 ppm) sodium methylcellulose is converted to a "low" sodium methylcellulose (e.g., less than about 500 ppm). The resulting ion-exchanged, low sodium methylcellulose, product exhibits more consistent extrusion from lot-to-lot compared to the commercially available (i.e., as-received) "high" sodium methylcellulose.

The comparative material specification for NaCl in methylcellulose is 1 weight %. A commercial source of methylcellulose (Dow Chemical), uses a simple washing technique to remove free Na ions but some Na ions are physically anchored in the cellulose fiber and are difficult to remove. The disclosed ion-exchange method is relatively simple and very effective, even for celluloses from difficult-to-wash pulp sources, and the method can remove bound Na ions.

High sodium content in methylcellulose binders impacts, for example, production of high cell density, small wall thickness honeycomb bodies (e.g., a 900/2 body) by increasing the screen pressure in the mixer-extruder. The 900/2 is a honeycomb green body and its corresponding ceramic article having 900 cell per square inch and 2 mils in web thickness. As the screen pressure increases, the skin forming operating window normally becomes smaller and can affect skin and shape quality of the extruded logs. High screen pressure can also cause more frequent screen changes and more production interruptions.

The problem of enabling a batch extruder for ceramic-forming compositions to operate at minimal back pressure while maintaining the extruded and final fired product materially consistent and functionally acceptable can be solved by providing batch compositions having little or no sodium (Na) ion present in the methylcellulose binder. Additionally or alternatively, the problem of minimizing extrusion back pressure can be solved or controlled by providing batch compositions having an alkyl cellulose salt other than the sodium salt as the binder.

In embodiments, the ceramic-forming batch mixture includes a ceramic component, a diluent or like liquid vehicle, and an ammonium salt of an alkylated cellulose binder. The ceramic component may comprise any convenient ceramic material. The diluent or like liquid vehicle can comprise any suitable liquid, such as water, alcohols, glycerin, organic solvents, or a mixture thereof.

In embodiments, the method includes forming a ceramic green body from the mixture by extruding the mixture. Typically, extrusion occurs through a die. The ceramic green body may be dried to remove substantially all of the diluent, and may then be fired at an elevated temperature to form a ceramic article. The ceramic green body combines good strength with good skin properties. In one embodiment, the method includes extruding the mixture through a die to produce a porous ceramic green body.

In embodiments, the ceramic article can be made by a method comprising forming a mixture by blending a ceramic component with a diluent, and an ammonium salt of an alkylated cellulose binder; extruding the mixture through a die to form a ceramic green body; drying the ceramic green body to remove substantially all of the diluent; and firing the ceramic green body to obtain the porous ceramic article. In embodiments, the ceramic article includes a honeycomb filter or substrate comprising aluminum titanate, cordierite, or both.

In embodiments, the disclosure provides an extrudable ceramic batch composition comprising:
ceramic forming inorganic ingredient ingredients, and a binder and liquid vehicle mixture, the binder comprising an alkylcellulose salt having less than about 500 ppm of sodium ion.

In embodiments, the disclosure provides a method for operating a ceramic batch extruder at minimal back pressure comprising: mixing and extruding a mixture of ceramic forming ingredients with a methylcellulose salt binder that has little or no sodium ions present and a liquid vehicle.

In embodiments, the disclosure provides a method for stabilizing ceramic precursor green body composition and extrusion, the method comprising:
extruding a formulation comprising:
ceramic forming inorganic ingredients, and
a binder and liquid vehicle mixture, the binder comprising
an ammonium methylcellulose salt.

In embodiments, the disclosure provides a binder having less that about 500 ppm total sodium ion.

Figure 1:
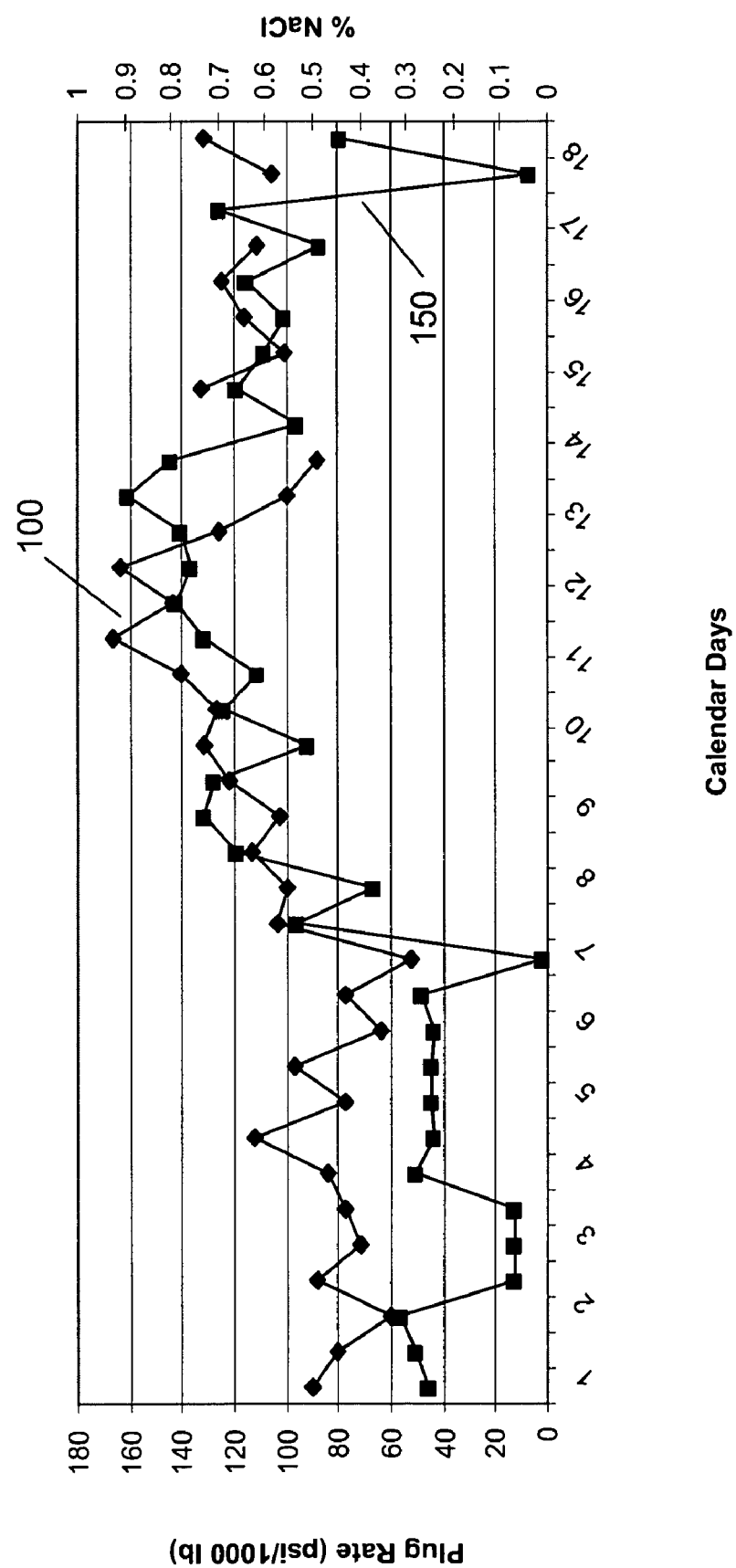
FIG. 1 illustrates observed plug rates and the corresponding NaCl weight % for a ceramic forming green body honeycomb composition having 900 cells per square inch and 2 mils in web thickness (900/2), in embodiments of the disclosure.

Referring to the Figures, FIG. 1 shows a periodic screen plug rate (in psi/1,000 lb) (100) (diamonds) and % NaCl (150) (squares) over an exemplary range of operating calendar days. As the % NaCl begins to increase, for example, around day 7, the plug rate from extrusion also begins to increase rapidly. A comparative ceramic-forming green body composition having an F-series (Dow) sodium salt of methylcellulose binder is listed in Table 1.

TABLE 1

Ceramic-forming green body composition.

| Component | Weight Percent |
|---|---|
| talc | 39.94 |
| calcined clay | 20.56 |
| hydrous clay | 16.54 |
| alumina | 7.64 |
| silica | 4.24 |
| boehmite | 11.04 |
| Total Inorganics | 100.00 |
| F-series methylcellulose (Dow) | 5.00 |
| tall oil lubricant | 0.81 |
| polyolefin oil lubricant | 6.50 |
| water | 34.50 |
| Total Batch | 146.81 |

Figure 2:
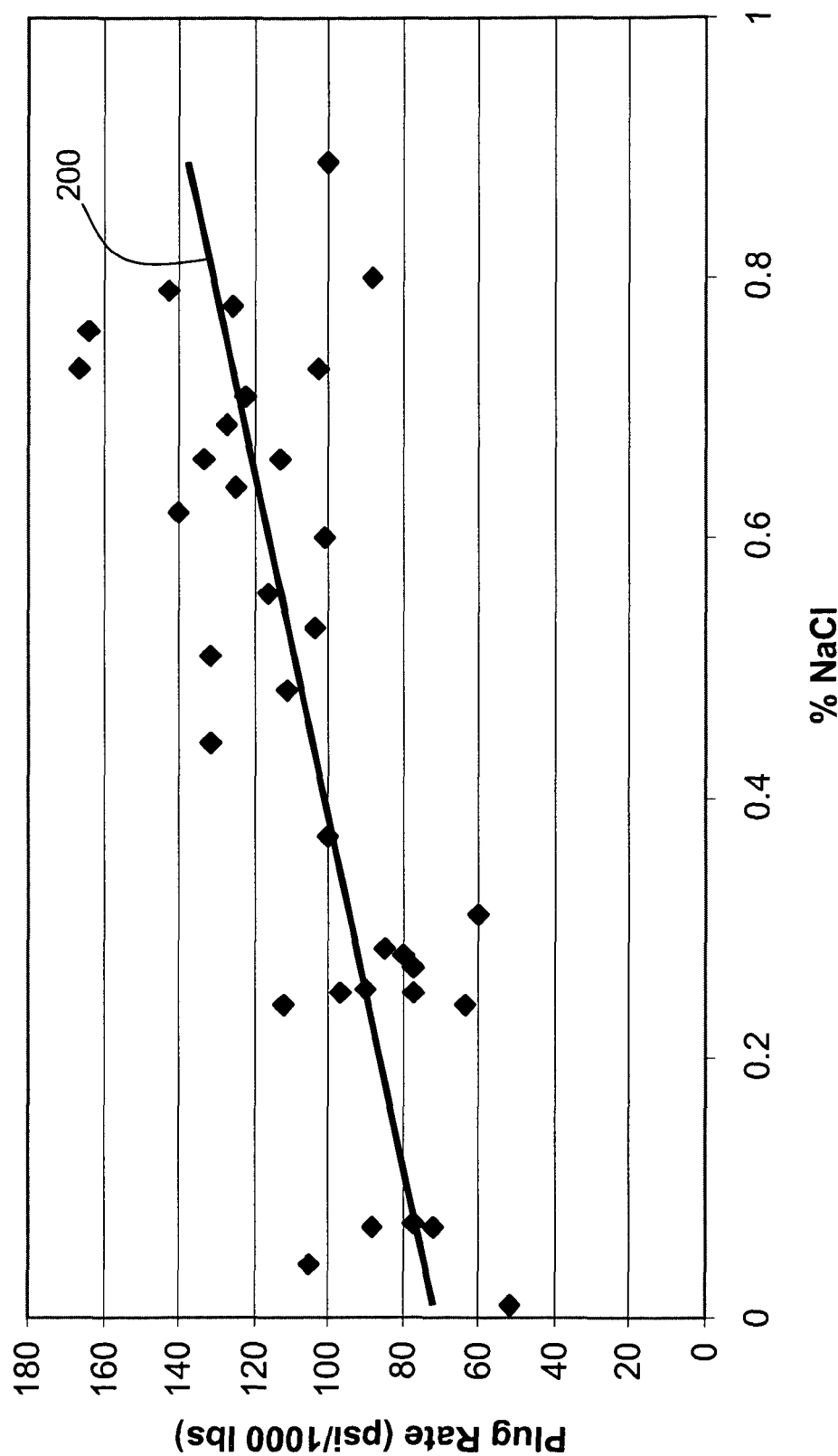
FIG. 2 illustrates observed plug rates vs NaCl weight %, in embodiments of the disclosure.

As the % NaCl dropped around day 11, so did the plug rate. FIG. 2 shows the plug rate vs NaCl (%) for various lots of methylcellulose. The fitted line (200) has a slope given by y=74.057x+71.379 and $R^2$ of 0.4721. The higher the NaCl level, the higher plug rate. An upper workable specification for NaCl can be, for example, 1%. Reducing the NaCl (%) specification to below about 0.5-0.6% poses a technical challenge for methylcellulose suppliers, such as Dow Chemical, and could be very difficult or impossible to attain for certain pulp sources having less accessible cellulose structures.

The present disclosure provides an ion-exchange technique which is summarized by the equation in FIG. 3. This ion-exchange method is relatively simple and very effective even for difficult-to-wash pulp sources. This method can remove even bound Na ions, which is not believed to be possible with currently used washing techniques. First, ammonium ($NH_4^+$) cations were used to exchange-out the sodium cations ($Na^+$) in the methylcellulose, for example, using ammonium acetate in a glacial acetic acid and acetone mixture. The ion-exchange procedure can be conducted at room temperature. The ratio of ammonium acetate, glacial acetic acid, acetone, and F-series methylcellulose binder (e.g., F240) was, for example: ammonium acetate/glacial acetic acid/acetone/F240 binder=0.9 g/6.9 g/100 g/10 g.

A solution of ammonium acetate, glacial acetic acid, and acetone was first prepared by mixing all ingredients until the ammonium acetate completely dissolved. 10 g of sodium methylcellulose was added to the solution to form a slurry (sodium methylcellulose acetone insoluble). The sodium ions in the methylcellulose were allowed to ion-exchanged with $NH_4^{(+)}$ ions for about 10 seconds. The slurry was then washed three times with excess portions (about 100 gm each) of acetone. The acetone washed slurry was passed through a paper filter to recover the ammonium methylcellulose product. The recovered ammonium methylcellulose was then air dried in a hood for about 16 hours at room temperature before further formulation. The $Na^+$ and $NH_4^+$ ion level in the ammonium methylcellulose product can be determined by inductively coupled plasma (ICP).

FIG. 4 shows $Na^+$ level in methylcellulose after an ion-exchange step as a function of $NH_4^+$ in acetone. The $Na^+$ level can be significantly reduced by using an adequate amount of $NH_4^+$. The more $NH_4^-$ that is ion exchanged, the greater the reduction in $Na^+$ level. To show the effect of Na ions on extrudability, four lots of methylcellulose were ion-exchange with $NH_4^+$. The four lots of methylcellulose (from Dow Chemical) were Lot #1 (NaCl=0.15%), Lot #2 (NaCl=0.89%), #3 (NaCl=0.6%), and #4 (NaCl=0.95%). The NaCl level in the methylcellulose ranged from about 0.15% to about 0.95%. The untreated methylcellulose and treated (ion-exchange) methylcellulose products were used in the same ceramic-forming green body precursor composition using the same water call and same organic package. A die and twin screw setups were kept the same during this experiment. The comparative ceramic-forming green body composition having an F-series (Dow) sodium salt of methylcellulose and the inventive ammonium salt of methylcellulose binder composition are summarized in Table 2.

TABLE 2

Ceramic-forming green body composition.

| Component | Weight Percent |
|---|---|
| Talc | 40.90 |
| calcined clay | 19.30 |
| hydrous clay | 14.99 |
| Boehmite | 2.00 |
| coarse alumina | 13.80 |
| Silica | 6.00 |
| fine alumina | 3.00 |
| Total Inorganics | 100.00 |
| sodium salt of methylcellulose (Dow) or ammonium salt of methylcellulose | 2.80 |
| stearic acid lubricant | 0.30 |
| polyolefin oil lubricant | 4.50 |
| tall oil lubricant | 0.50 |
| Water | 25.70 |
| Total Batch | 133.80 |

The extruded batch compositions are summarized in Table 2. The variability in extrusion pressure was greatly reduced using the disclosed treated methylcellulose formulations. The extrusion pressure shows high variability among four lots of untreated methylcellulose. The variability in extrusion die pressure is greatly reduced by using the disclosed treated ammonium methylcellulose binder, for example, die pressure variability of less than about 110 psi, less than about 100 psi, and less than about 90 psi.

Table 3 lists the NaCl wt % (as measured by Dow), Na in ppm as measured by ICP (as measured by Corning Inc.), and the steady state die pressure for each lot of methylcellulose from 40 mm extrusion. The NaCl % correlated well with Na (in ppm) from ICP. Similar data for the treated methylcellulose is shown in Table 4. As can be seen, the treated methylcellulose significantly reduced the extrusion variability for four lots of methylcellulose.

TABLE 3

| Untreated | NaCl (%) (from Dow) | Na (ppm) (by ICP) | steady state die pressure (psi) |
|---|---|---|---|
| Lot #1 | 0.15 | 800 | 1,806 |
| Lot #2 | 0.6 | 2,800 | 1,596 |
| Lot #3 | 0.95 | 3,700 | 1,350 |

TABLE 3-continued

| Untreated | NaCl (%) (from Dow) | Na (ppm) (by ICP) | steady state die pressure (psi) |
|---|---|---|---|
| Lot #4 | 0.89 | 3,600 | 1,275 |
| Average | — | 2,725.0 | 1,506.8 |
| Std. Dev. | — | 1,164.8 | 209.6 |

TABLE 4

| Treated | NaCl (%) (from Dow) | Na (ppm) (by ICP) | steady state die pressure (psi) |
|---|---|---|---|
| Lot #5 | NA | 120 | 1,830 |
| Lot #6 | NA | 850 | 1,570 |
| Lot #7 | NA | 1,400 | 1,560 |
| Lot #8 | NA | 440 | 1,670 |
| Average | — | 702.5 | 1,657.5 |
| Std. Dev. | — | 478.7 | 108.5 |

FIG. 5 shows the die pressure versus the concentration of Na ion in methylcellulose for untreated samples (diamonds) (500) and treated samples (squares) (520) of methylcellulose. Lines (510) and (530) were fitted for the respective untreated samples and treated samples. Line (510) for the untreated samples had a slope given by y=−0.1704x+197.2. Line (530) for the treated samples had a slope given by y=−0.2015x+1799.1. Although not limited by theory, the reduction in variability of the four treated lots of methylcellulose compared to the four untreated lots is believed to be the result of the lowered Na level in methylcellulose. The slopes of these two lines appear to be similar, suggesting that the treated and untreated methylcellulose follow the same die extrusion pressure versus $Na^+$ relationship. This also suggests that a lower and narrower distribution in Na ion or total sodium level from lot-to-lot may result in a narrower distribution in die pressure from run-to-run, and thus improve extrusion consistency and efficiency.

In embodiments, the disclosure provides a ceramic precursor batch composition, comprising: inorganic ceramic-forming ingredients, an organic binder comprising an ammonium salt of an alkylated cellulose, and a liquid vehicle.

Inorganic ceramic-forming ingredients can comprise, for example, from about 35 to about 80% by weight of the inorganic ingredients; the ammonium salt of an alkylated cellulose can comprise, for example, of from about 1 to about 5% by weight of the inorganic ingredients, by super-addition; and the liquid vehicle to balance, based on the weight of the batch mixture prior to extrusion.

In embodiments, the composition can further comprise, for example, a pore former batch material in an amount of from about 10 to about 20% by weight, by super-addition; and a fatty acid oil in an amount of from about 0.2 to about 2% by weight of the inorganic ingredients and pore former batch material, by super-addition.

In embodiments, the ammonium salt of the alkylated cellulose can be, for example, ammonium methyl cellulose.

In embodiments, the ammonium salt of an alkylated cellulose can be, for example, from about 1 to about 8 wt % by super addition to the inorganic ingredients.

In embodiments, the ceramic-forming ingredients can comprise sources of alumina, titania, silica, or mixtures thereof In embodiments, the inorganic ceramic-forming ingredients can be or include, for example, at least one of: cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, silicon carbide, silicon nitride, soda lime, aluminosilicate, borosilicate, soda lime, barium borosilicate, and like ingredients, or a mixture of thereof In embodiments, the ceramic forming green body, can comprise, for example, a mixture of inorganic ceramic-forming materials in an amount of from about 40 to about 80 wt %; a pore former comprising a mixture of a graphite and a starch in an amount of from about 10 to about 20% by weight as super-addition; and an organic binder comprising an ammonium salt of an alkylated cellulose and a liquid vehicle in a combined amount of from about 1 to about 20% by weight as super-addition to the inorganic ceramic-forming materials and the pore former batch.

In embodiments, the inorganic ceramic-forming ingredients can comprise, for example, from about 35 to about 85% by weight of the total batch material; the pore former comprises from about 10 to about 20% by weight of the inorganic batch material, by super-addition; the alkyl cellulose salt comprises of from about 2 to about 10% by weight of the combined inorganic materials and pore former batch materials, by super-addition; the fatty acid oil comprises from about 0.2 to about 2% by weight of the combined inorganic and pore former batch material, by super-addition; and the liquid vehicle to balance, based on the total weight of the batch mixture prior to extrusion.

In embodiments, the disclosure provides an aluminum titanate ceramic forming batch mixture, the mixture including, for example: inorganic batch materials comprised of sources of alumina, titania, and silica; a pore former comprised of a graphite and a starch in a weight ratio of, for example, from about 1:1 to 3:5; an organic binder comprised of a an ammonium methyl cellulose having a methoxyl substitution of from about 12 to about 35 wt % based on the total weight of the methyl cellulose; and a liquid vehicle or diluent.

In embodiments, the disclosure provides a method for making a ceramic precursor green body, the method comprising: mixing inorganic ceramic-forming ingredients to form a batch; adding to the batch and further mixing a mixture of an organic binder comprising an ammonium salt of an alkylated cellulose and a liquid vehicle, to form a plasticized mixture; and extruding and drying the plasticized mixture to form the green body.

The alkyl of the alkylated cellulose can comprise, for example, at least one of methyl, ethyl, propyl, butyl, and like substituents, or combinations or mixtures thereof.

In embodiments, the ammonium salt of an alkylated cellulose can comprise, for example, an ammonium cation selected from the group of $NR^1_4{}^+$, or mixtures thereof, where each $R^1$ is independently selected from —H, or a linear or branched —$(C_{1-4})$alkyl.

In embodiments, the extruding can be accomplished at a reduced die pressure variability, as measured by standard deviation of die pressure, from about 5 to about 100% reduction, at a reduced screen plugging interval of from about 10 to about 100% reduction, or both, compared to the same extruded batch having a sodium methylcellulose binder in place of an ammonium salt of an alkylated cellulose.

In embodiments, the organic binder can be present in the plasticized mixture, for example, in an amount of from about 0.6 to about 6 weight percent and the liquid vehicle can be present in an amount of from about 16 to about 50 weight percent based on the total weight of the plasticized mixture.

In embodiments, the inorganic ceramic-forming ingredients can further include a pore former comprising a mixture of graphite and starch.

In embodiments, the organic binder can have a sodium ion concentration, for example, of less than about 500 ppm.

In embodiments, the disclosure can further comprise firing the green body to produce a predominant ceramic phase.

In embodiments, the batch mixture can include, for example: sources of alumina, titania, and silica in an amount of from about 35 to about 85 wt %; the pore former in an amount from about 10 to about 20% by weight of the inorganic batch material by super-addition; the methyl cellulose salt in an amount from about 3 to about 5% by weight of the combined inorganic and pore former batch material by super-addition; and the liquid vehicle to balance, such as in an amount from about 16 to about 50 wt %, based on the total weight of the batch mixture prior to extrusion.

The green body can include a plurality of interconnected cell walls forming a plurality of cell channels traversing the body.

In embodiments, the batch composition liquid vehicle can be, for example, water, water miscible liquids such as alcohol, acetone, and like solvents, or combinations thereof to dissolve or disperse the binder with the other ingredients of the batch. A 2% (w:v) solution of the binder in water can have a viscosity at 20° C., for example, of about 30,000 to about 50,000 centipoise (cP), about 35,000 cP to about 45,000 cP, and about 38,000 cP to about 42,000 cP, including intermediate ranges and values. The ceramic forming materials can be, for example, sources of alumina, titania, and silica, and the hydroxypropyl methyl cellulose binder can have a molecular weight, for example, of from about 25,000 to about 300,000, including intermediate ranges and values.

The fatty acid oil can be, for example, tall oil (tallol), tall oil fatty acid, oleic acid, tallow fatty acids, and like oils, or mixtures thereof, in an amount of from about 0.2 to about 2%, 0.5 to about 1.5%, and from about 1 to about 1.5% by weight, including intermediate ranges and values, of the combined inorganic and pore former batch materials, by super-addition.

In embodiments, the disclosure provides a method for enhancing throughput of one ore more process steps, such as increased feed rates in extruding the manufacture of a ceramic precursor green body, the method including:
mixing inorganic ceramic-forming ingredients with a pore former to form a batch;
adding an organic binder of a salt of methylcellulose having a low sodium ion level, such as less than about 500 ppm, and a liquid vehicle to the batch and further mixing to form a plasticized mixture; and
extruding and drying the plasticized mixture to form a green body.

The extruded and dried green body can be fired to produce a honeycomb ceramic, such as an aluminum titanate.

In embodiments, the disclosure provides a method for enhancing throughput of one or more process steps, such as increased feed rates in extruding the manufacture of a ceramic precursor green body, the method including:
mixing inorganic ceramic-forming ingredients with a pore former to form a batch;
adding an organic binder of a salt of methyl cellulose having a low sodium ion level, such as less than about 500 ppm, and a liquid vehicle to the batch and further mixing to form a plasticized mixture; and
extruding and drying the plasticized mixture to form the green body.

In embodiments, the disclosure provides a method wherein extruding the plasticized mixture provides an increased feed rate of, for example, from about 10 to about 30% compared to a batch having the same pore former, and a methyl cellulose salt binder with a methoxyl substitution of about 12 to about 35 wt % based on the total weight of the methyl cellulose.

The drying can be accomplished at an increased feed rate of from about 10 to about 30% compared to the comparative batch.

In embodiments, the disclosure provides a method for controlling the gelation onset temperature during extrusion of a honeycomb green body batch, the method comprising: mixing inorganic ceramic-forming ingredients with a pore former to form a batch; adding an organic binder comprising a salt of a methyl cellulose and a liquid vehicle to the batch and further mixing to form a plasticized mixture; and extruding the plasticized mixture to form the green body. The extruded mixture can have a gelation onset temperature difference ($\Delta T_{onset}$) of from about 3° C. to about 10° C., including intermediate ranges and values, at a constant material stiffness or viscosity compared to a batch having a sodium methyl cellulose salt binder.

In embodiments, the batch materials can comprise sources of alumina, titania, and silica. In embodiments, the manufacture method can further comprise firing the green body to produce a predominant ceramic phase, for example, aluminum titanate.

In embodiments, the disclosure provides products that include the fired articles and methods of using the articles of the disclosure. In embodiments, the firing can produce, for example, a ceramic article having a material composition, expressed in weight % on an oxide basis, comprising from about 40 to about 65% $Al_2O_3$, from about 25 to about 40% $TiO_2$, and from about 3 to about 12% $SiO_2$.

In embodiments, the batch mixtures and processes of the present disclosure are superior to related mixtures and processes that employ similar components but differ in the amounts of components selected and the relative weight ratio of the components selected. The superiority of the batch mixtures and processes of the present disclosure obtains from superior feed rates in extrusion. Although not bound by theory, the increased feed rate in extrusion is believed to be enabled by an increase in gelation temperature of the batch mixture.

In embodiments, the batch mixtures can provide a superior feed rate in extrusion of from about 10 to about 30%, compared to, for example, the same batch instead having a commercially available methyl cellulose binder with a nominal sodium ion content of about 0.7 to about 1 wt percent.

Copending U.S. Provisional Application No. 60/686,117, filed May 31, 2005, entitled "Aluminum Titanate Ceramic Forming Batch Mixtures and Green Bodies Including Pore Former Combinations and Methods of Manufacturing and Firing Same," now U.S. Patent Publication 20070006561 (copending U.S. Ser. No. 11/445,024), discloses, for example, a ceramic forming batch mixture including inorganic batch materials, such as sources of alumina, titania, and silica, a pore former combination including first and second pore formers with different compositions; an organic binder; and a solvent. Also disclosed is a method for producing a ceramic article involving mixing the inorganic batch materials with the pore former combination having first and second pore formers of different composition, adding an organic binder and a solvent, forming a green body; and firing the green body.

Copending U.S. Provisional Application No. 60/932,476, filed May 31, 2007, entitled "Aluminum Titanate Ceramic Forming Batch Mixtures and Green Bodies with Pore Formers," discloses, for example, a ceramic forming batch mixture including inorganic batch materials, such as sources of alumina, titania, and silica, a low amount of one or more pore formers including at least one starch; an organic binder; and a solvent.

Copending U.S. Provisional Application No. 61/004,996, filed Nov. 30, 2007, entitled "Ceramic Precursor Batch Composition and Method of Increasing Ceramic Precursor Batch Extrusion Rate," discloses, for example, a ceramic precursor batch composition comprising inorganic ceramic-forming ingredients, a hydrophobically modified cellulose ether binder having a molecular weight less than or equal to about 300,000 g/mole and an aqueous solvent. The ceramic precursor batch composition has a ratio of binder to aqueous solvent of less than about 0.32. The ceramic precursor batch composition can be used to increase the rate of extrusion of the composition. A method for increasing a rate of extrusion of a ceramic precursor batch composition is also disclosed.

U.S. Pat. No. 3,919,384, to Cantaloupe, et al., assigned to Corning Glass Works, entitled "Method for Extruding Thin-Walled Honeycombed Structures," mentions extrusion of mixtures of particulate blends, water, and methyl cellulose having a gel point.

U.S. Pat. No. 7,288,222, to Matsumoto, et al., assigned to Toto, Ltd., entitled "Method for Producing a Carbide Sintered Compact," mentions wet-type compacting with a compacting aid, such as high molecular weight organic polymers, to improve flow and dispense characteristics of powder slurries, for example, in slip-casting applications, and to function as a binder and plasticizer, see col. 8, lines 53-65, but doesn't appear to mention an ammonium salt of an alkylated cellulose binder.

In embodiments, the present disclosure provides batch mixtures that can contain aluminum titanate ceramic forming compositions with a combination or mixture of particulate pore formers. The pore former can be, for example, two or more pore former agents, such as graphite and starch, in a specified amount and in a specified ratio. The pore former can be, for example, a batch addition which provides or assists in the formation of interconnected pores (voids) in the resultant ceramic article upon completion of the firing cycle. The pore former preferably burns-out, i.e., decomposes or oxidizes, and preferably is converted to a gas, such as CO or $CO_2$, and leaves behind the desired void or porosity, which is preferably open-interconnected porosity, within, for example, the final aluminum titanate ceramic article as the article being fired. "Burn-out" of the pore former occurs, preferably, before the formation of the principal ceramic phase, such as a phase of aluminum titanate. Although not bound by theory, the use of two or more different pore forming agents is believed to space out the exothermic reactions associated with burn-out, such that the overall temperature peaks are lowered as compared to a single pore forming agent, for example, using graphite alone.

In embodiments, the disclosed ceramic article can be a ceramic honeycomb body comprised of a plurality of intersecting cell walls. In embodiments, the ceramic article is a substrate, which can be coated with a catalyst, such as a catalyzed flow-through substrate. In embodiments, a plurality of the cells of the honeycomb body of the ceramic article can be plugged, for example, to form a wall-flow filter. A ceramic article containing, for example an aluminum titanate phase, can be a honeycomb body having a plurality of intersecting cell walls. In embodiments, this article can be configured as a particulate filter and can include an inlet end, which is exposed in use to an incoming exhaust stream, and an outlet end opposed thereto, through which the filtered exhaust gases exit where exhaust gas passes through the porous ceramic wells. This article can include a plurality of inlet channels extending and traversing along the length of the filter, and a plurality of exit channels also extending and traversing along the length of the filter alongside the inlet channels. In embodiments, the shape of the channels can be generally square and they may include small radii or bevels on the corners thereof Alternatively or additionally, the channels (e.g., the cross-sectional shape of the channel in a transverse plane perpendicular to the longitudinal axis of article) can have other shapes. Other channel shapes can be, for example, rectangular, triangular, octagon, hexagon, circular, and like shapes, or combinations thereof The cross-sectional area of each of the inlet and outlet channels can be different. For example, the average inlet area of inlet channels may be larger than the average outlet area of the outlet channels. Intersecting cell walls can be formed by, for example, extruding the disclosed batch mixture composition through an extrusion die to form an extruded green body. Although extrusion is one preferred forming method, the forming step may include any known method for forming green bodies.

Plugs can be made from suitable ceramic material and extend radially across and between the intersecting walls to close off (i.e., seal) an end of each of the channels. Plugs can be formed, for example, by the methods of U.S. Pat. No. 4,557,773. Any suitable plugging technique can be used. Further, partial channels (e.g., channels which do not share a common shape with the majority of channels on a transverse plane of the article, such as at or near the outer periphery of the honeycomb body) adjacent to the skin can be plugged on both ends to add strength, if desired. The article described above can be a particulate wall-flow filter. The disclosed batch mixture, firing, and manufacture methods can also be useful for non-filter applications, for example, as catalyzed flow-through substrates.

In embodiments of the disclosure, the total amount (wt %) and relative ratio (w:w or weight ratio) of pore formers selected can promote more rapid burn-out of the pore formers within the aluminum titanate forming green body, compared to batch mixtures having higher wt % and weight ratio of pore formers. Batch formulation mixtures having combinations of reduced levels of pore former can provide levels of porosity greater than, for example, about 40%, and can also provide shorter drying and firing cycles for aluminum titanate articles. In embodiments, the aluminum-titanate-forming compositions of the disclosure can include pore former combinations that can reduce the overall propensity of the resultant ceramic parts to crack upon firing. In embodiments, the porosity of the fired ceramic article can be less than about 50%, which can result in stronger ceramic (e.g., honeycomb) bodies (e.g., substrates or filters). In embodiments, the porosity of the fired ceramic article can be greater than about 40% and less than about 55%.

The pore formers of the disclosed batch mixtures can include a pore former such as starch or graphite or a mixture of a graphite and a starch, where the pore former can be present in, for example, about 10 to about 25% by weight of the inorganic batch materials by super-addition. The pore former mixture can include other pore forming agents in addition to graphite and starch which do not substantially effect the improved extrusion and drying properties of disclosed compositions. The starch can include one starch or more than one starch. The starch can be selected from various starch types or sources, for example, from corn, barley, bean, potato, rice, tapioca, pea, sago palm, wheat, canna, and like starches, or combinations thereof. In embodiments, the starch can be about 2% to about 15%, by weight, from about 5% to about 10 wt %, or from about 6% to about 9 wt % of the inorganic batch materials. In embodiments, the graphite can be, for example, in one or more of the following forms: crystalline such as flakes; amorphous such as fine particles; or lump, and like forms, or a combination thereof. In embodiments, the pore former includes essentially no thermoplastic polymer or thermoset polymer.

In embodiments, the inorganic batch materials can contain about 5 wt % to about 25 wt % of the pore former mixture, including intermediate values and ranges. In embodiments, the inorganic batch materials can contain about 10 wt % to about 20 wt %, by super-addition, of the pore former prior to firing.

In embodiments, the aluminum titanate ceramic forming green body can include, for example: a homogeneous mixture of inorganic batch materials including sources of alumina, titania, and silica; a pore former mixture of starch and graphite, the pore former mixture can be, for example, less than about 15 wt % of the inorganic batch materials; and an organic binder. The extruded green body can include a plurality of interconnected cell walls forming a plurality of cell channels traversing the body.

In embodiments, the disclosure provides a method of making an aluminum titanate containing ceramic article, the method comprising, for example: mixing inorganic batch materials with a pore former to form a batch composition, wherein the pore former is of from about 5 to about 25% by weight of the inorganic batch material by super-addition; adding an organic binder of the disclosure and a liquid vehicle, such as an aqueous solvent, to the batch composition and further mixing to form a plasticized mixture; forming a green body from the plasticized mixture by, for example, extrusion and drying; and firing the green body to produce a ceramic body having a predominant phase of aluminum titanate. In embodiments, the ceramic body has a porosity of greater than about 40%. In embodiments, the porosity can be greater than about 40% and less than about 50%. In embodiments, the porosity can be less than about 50%.

The ceramic article so produced can have a porosity of greater than about 40%, and in embodiments greater than about 45% and less than about 50%, as measured by mercury porosimetry. In embodiments, Median Pore Size (MPS) of the article can be less than about 15 microns, and from about 8 to about 15 microns. In embodiments, the $(d_{50}-d_{10})/d_{50}$ is less than about 0.7, and in embodiments from about 0.2 to about 0.7. The compositions, articles, and methods of the disclosure are particularly useful for producing honeycomb aluminum titanate ceramic articles, and more particularly for producing aluminum-titanate-containing ceramic particulate filters useful for filtering particulate matter from exhaust streams. The $d_{10}$ of a fired ceramic article is the pore diameter at which the cumulative mercury intrusion volume equals 10% of the total mercury intrusion volume. The Median Pore Diameter (MPD), $d_{50}$, is the pore diameter at which the cumulative mercury intrusion volume equals 50% of the total mercury intrusion volume. One measure of the pore size distribution of a ceramic article is characterized by a $d_{factor}$, wherein $d_{factor}=(d_{50}-d_{10})/d_{50}$. In embodiments, MPS and MPD can be used interchangeably to describe pore structure and properties.

A suitable source of alumina can be, for example, a powder which when heated to a sufficiently high temperature in the absence of other raw materials, will yield substantially pure aluminum oxide. Such suitable alumina sources include alpha-alumina, a transition alumina such as gamma-alumina or rho-alumina, hydrated alumina, gibbsite, corundum ($Al_2O_3$), boehmite (AlO(OH)), pseudoboehmite, aluminum hydroxide (Al(OH)$_3$), aluminum oxyhydroxide, or like materials, and mixtures thereof. In embodiments, the median particle diameter of the source of alumina is below about 35 microns.

A suitable titania source can be, for example, rutile, anatase, or an amorphous titania. The median particle size of the titania source can be selected to avoid entrapment of unreacted oxide by the rapidly growing nuclei in the structure. In embodiments, the median particle size can be, for example, less than about 20 micrometers.

Suitable silica sources can include, for example, non-crystalline silica such as fused silica or sol-gel silica, silicone resin, low-alumina substantially alkali-free zeolite, diatomaceous silica, kaolin, and crystalline silica, such as quartz or cristobalite. Additionally, the silica-forming source can comprise a compound that forms free silica, when heated, for example, silicic acid or a silicon organometallic compound. The median particle size of the silica source can be, for example, less than about 30 micrometers.

If strontium is optionally selected as an alkaline earth metal oxide, then a suitable strontium source can be, for example, strontium carbonate, having a median particle size of, for example, less than about 20 micrometers. If barium is selected, suitable barium sources can be, for example, barium carbonate, barium sulfate, or barium peroxide, having a median particle size of, for example, less than about 20 micrometers. If calcium is selected, the calcium source can be, for example, calcium carbonate, calcium aluminate, or a mixture thereof, having a median particle size of, for example, less than about 20 micrometers.

If a rare earth is selected, then a suitable source of rare earth oxide can be, for example, lanthanum oxide ($La_2O_3$), yttrium oxide ($Y_2O_3$), any oxide of the lanthanide series, or combinations thereof.

In embodiments, the abovementioned inorganic batch materials can be combined as powders in a mixing step sufficient to produce an intimate mixing. The pore former(s), individually or in combination, can be added to this mix, either simultaneously or with the other batch components or after the inorganic materials are intimately mixed. The pore former can be intimately mixed with the inorganic batch materials to form, for example, a homogeneous powdered mixture of the inorganic materials and the pore former.

The organic binder system can be added to the batch inorganic materials and the pore formers to create an extrudable mixture that is formable and moldable. A preferred multi-component organic binder system for use in embodiments of the disclosure includes a binder of a cellulose-containing component, a surfactant component, and a liquid vehicle. The binder system can include a base such as triethanol amine (TEA), added for example at about 0.1 to about 0.5 wt %, which base acts as a dispersant to help disperse the surfactant. The cellulose-containing component can be, for example, an ammonium salt of an organic cellulose ether binder component selected from one or more alkylcellulose derivatives, such as methyl, ethyl, propyl, butyl, and like alkyl substituents on cellulose, or a combination thereof The surfactant component can be, for example, tall oil, and like surfactant, or a combination thereof. The liquid vehicle, such a solvent for the binder and a carrier for the insoluble ingredients, can be, for example, water such as deionized water. Excellent results have been obtained with an ammonium alkylcellulose-based binder system comprised of about 12 to about 35% methoxyl substitution by weight based on total methyl cellulose weight, optionally from about 0.2 to about 2.0 parts by weight of tall oil, and about 10 to about 30 parts by weight of water as solvent or liquid dispersant to balance, based on 100 parts-by-weight of the inorganic materials.

The individual components of the binder system can be, for example, mixed with a mass of the inorganic powder materials, binder in a liquid vehicle, and optionally a pore former mixture, in any suitable manner, to prepare an intimate homogeneous mixture of the inorganic powder material, pore former(s), and binder system. This aluminum titanate forming batch mixture can be formed into a ceramic forming green body, for example, by extrusion. All components of the binder system can be mixed with each other in advance, and the mixture can then be added to the powdered inorganic material previously mixed with the pore formers. In this instance, the entire portion of the binder system can be added at once, or divided portions of the binder system can be added sequentially at suitable intervals. Alternatively, the components of binder system can be added sequentially to the ceramic batch materials, or each previously prepared mixture of two or more components of the binder system can be added to the ceramic powder material and pore former combination. For example, the dry components can be first added to the inorganic batch materials and pore former combination, followed by the liquid components. Further, the binder system can be first mixed with a portion of the ceramic forming powder material. In this instance, the remaining portion of the ceramic forming powder is subsequently added to the prepared mixture. In embodiments, the binder system can be uniformly mixed with the inorganic batch powders and pore formers in a predetermined portion to form a homogeneous batch mixture. Uniform mixing of the binder system, the ceramic inorganic materials, and the pore former can be accomplished by, for example, a kneading process.

The resulting stiff, uniform, homogeneous, and extrudable batch mixture can then be further plasticized and shaped or otherwise formed into a green body. Such shaping or forming can be accomplished, for example, by ceramic forming processes, such as extrusion, injection molding, slip casting, centrifugal casting, pressure casting, press molding, and like processes, or a combination thereof For the preparation of a thin-walled honeycomb substrate suitable for use as a catalyst support or as a particulate filter, extrusion through a slotted extrusion die is suggested, see for example, U.S. Pat. No. 6,696,132, which discloses a "Honeycomb with Varying Size and Die for Manufacturing."

The prepared aluminum titanate ceramic forming green body, such as an extruded log or like shape formed from the plasticized extrudable batch mixture can be dried before firing. Drying can be achieved by, for example, drying methods such as hot-air, electromagnetic energy drying (e.g., RF or microwave), vacuum drying, freeze drying, and like methods, or a combination thereof can be used. The dried green body can then be suitably fired by heating to a sufficient top temperature (the highest temperature of the cycle) for a sufficient time to result in a fired ceramic body. In embodiments, aluminum titanate is the primary crystal phase formed as a result of firing the green body made from the disclosed batch mixture described above.

The firing conditions can be varied depending on the process conditions, such as specific composition of the batch, size of the green body, and nature of the equipment, but in embodiments can include burning-out the pore formers to produce, for example, the aluminum titanate phase when using the batch mixtures described herein. In embodiments, the green body can be heated in a furnace to a top temperature such as in a range having an upper limit below about 1,550° C. and a lower limit of above about 1,350° C., and in embodiments below about 1,460° C. and above about 1,420° C. and held in this range for greater than about 4 hours, such as between about 4 and about 30 hours, and in embodiments, between about 6 to about 20 hours. During firing, a predominant ceramic crystal phase is formed in the ceramic article. The ceramic crystal phase can be aluminum titanate for the batch described above.

As mentioned above, one use of the batch mixtures described herein is for preparing high strength aluminum titanate containing honeycomb articles useful as catalyst carriers, diesel particulate filters (which may also include a catalyst), and like articles or devices.

In embodiments, the disclosure provides ceramic forming compositions having a reduced level of residual sodium ion concentration in the cellulose binder compared to known compositions. The batch mixtures can provide improved feed rates in extrusion and drying process steps, which in turn provide increased efficiency of manufacture, reduced energy consumption, reduced costs, higher quality, and like benefits. In embodiments, the disclosed batch mixtures can provide, for example, reduced raw material costs since, for example, less graphite is used.

In embodiments, the batch compositions of the disclosure can provide increased extrusion feed rates, for example, increased by from about 10 to about 30% compared to a comparable composition having a high residual sodium ion concentration in the methyl cellulose binder. The batch compositions of the disclosure can impart or promote an elevated batch gelation temperature to the batch mixtures. The disclosed batch compositions can provide an overall reduction in total manufacture time of the ceramic precursors and the ceramic articles.

In embodiments, the disclosed batch mixtures can provide an aluminum titanate (AT) composition prior to firing having, for example, from about 3 to about 5% by weight of an ammonium methylcellulose binder, as super-addition to the combined inorganic and pore former batch material, and a pore former of, for example, from about 6 to about 8% by weight of a graphite, and from about 8 to about 10% by weight of a starch, as super-additions to the inorganic batch.

In embodiments, the disclosure provides compositions having a specific ammonium salt of an alkylated cellulose (e.g., ammonium methylcellulose) binder combined with a specific pore former combination. The compositions can provide an increased extrusion feed rate in batch, semi-continuous, or continuous green body manufacture compared to compositions having a commercially available methylcellulose binder having a high residual sodium ion. The disclosed compositions can retain microstructure and physical property attributes of an AT compositions disclosed in, for example, the abovementioned U.S. Patent Publication 20070006561 (U.S. Ser. No. 11/445,024), such as having 50% porosity and greater porosity.

Extrusion feed rates of AT compositions can be limited due to a problematic lower gelation temperature for the AT batch, and even lower batch stiffening temperature, at which temperatures part-shape deformation can occur as a result of flow front changes from skin-to-core batch temperature differences. Although not limited by theory, it is believed that the ammonium alkyl cellulose binder of the disclosure undergoes phase separation and gelation at a higher temperature, which allows the batch to extrude to higher temperatures before shape deformation so that higher extrusion feed rates can be realized.

METHOCEL™ cellulose ether products are available from The Dow Chemical Company (www.dow.com/methocel) in two basic types: methylcellulose and hydroxypropyl methylcellulose (HPMC) (also known as hypromellose;. METHOCEL™ products have a polymeric backbone of cellulose, a natural carbohydrate that contains a basic repeating structure of anhydroglucose units. In hydroxypropyl methylcellulose products (such as METHOCEL® J and K brand products), propylene oxide is used in addition to methyl chloride to obtain hydroxypropyl substitution on the anhydroglucose units. This substituent group, —OCH$_2$CH(OH)—CH$_3$, contains a secondary hydroxyl on the number two carbon and can also be considered a propylene glycol ether of cellulose. These products possess varying ratios of hydroxypropyl and methyl substitution, which can influence, for example, the solubility in organics and the thermal gelation temperature of aqueous solutions. In METHOCEL® K products, the methoxyl substitution is still the major constituent, see Table 5. The molar substitution (MS) is the number of moles of hydroxypropyl groups per mole of anhydroglucose.

TABLE 5

Comparison of METHOCEL ® F and K Products.

| METHOCEL ® Product Type | Methoxyl Degree of Substitution (DS) | Methoxy % | Hydroxypropyl Molar Substitution (MS) | Hydroxypropyl % |
|---|---|---|---|---|
| F | 1.8 | 28 | 0.13 | 5.0 |
| K | 1.4 | 22 | 0.21 | 8.1 |

A representative AT composition of the present disclosure is listed in Table 6. A related AT composition is disclosed in copending patent application U.S. Ser. No. 12/072,791, filed Feb. 28, 2008, entitled "METHOD OF INCREASING CERAMIC PASTE STIFFENING/GELATION TEMPERATURE BY USING A SALT AND PRECURSOR BATCH."

TABLE 6

Composition of aluminum titanate containing ceramic paste.

| | Material | Weight Percent |
|---|---|---|
| INORGANICS | silica | 10.19 |
| | strontium carbonate | 8 |
| | calcium carbonate | 1.38 |
| | alumina | 46.57 |
| | titanium dioxide | 29.95 |
| | hydrated alumina | 3.71 |
| | lanthanum oxide | 0.2 |
| Total | | 100 |
| PORE FORMERS | potato starch | 8 |
| | graphite | 8 |
| Total | | 116 |
| BINDER(S) | ammonium methylcellulose | 4 |
| Total | | 120 |
| OTHER LIQUID ADDITIONS | fatty acid oil | 1 |
| | water (to balance) | |
| | Grand Total | 121 |

EXAMPLES

The following examples serve to more fully describe the manner of using the above-described disclosure, and to set forth examples contemplated for carrying out various aspects of the disclosure. It is understood that these examples are presented for non-limiting demonstrative purposes.

Example 1

Ion exchange procedure—Low sodium methylcellulose preparation The ion-exchange procedure was conducted at room temperature. 6.9 g of glacial acetic acid was added to 100 g of acetone in a flask. The solution was mixed using magnetic stir bar for about 2 to about 5 minutes before adding 0.9 g ammonium acetate. The mixture was stirred until ammonium acetate completely dissolved and the solution turned clear. 10 g of methylcellulose F20 (Dow) was added to the solution to form a methylcellulose/liquid suspension since methylcellulose was not soluble in acetone. The sodium ions of the methylcellulose were allowed to ion-exchange with NH$_4^{(+)}$ cations for an effective period of time, for example, for about 10 seconds. The suspension was passed through a filter paper in a funnel to recover the insoluble methylcellulose. Once insoluble methylcellulose was captured on the filter paper, 100 g of acetone was added to the funnel to wash the methylcellulose. The wash cycle was repeated three times to ensure the removal of the unwanted chemicals. The recovered methylcellulose was then dried in the hood for 16 hours at room temperature before further use. Four lots of commercially available methylcellulose were treated to remove the sodium using this procedure. The Na ion content in methylcellulose before and after the ion-exchange treatment was measured using ICP and listed in Table 7. As can be seen, the ion-exchange procedure produced a significantly lower sodium level in each lot of the methylcellulose.

TABLE 7

| Lot number | Before ion-exchanged treatment Na (ppm) | After ion-exchanged treatment Na (ppm) |
|---|---|---|
| Lot #1 -> #5 | 800 | 120 |
| Lot #2 -> #6 | 2800 | 850 |
| Lot #3 -> #7 | 3700 | 1400 |
| Lot #4 -> #8 | 3600 | 440 |
| Average | 2725.0 | 702.5 |
| stdev | 1164.8 | 478.7 |

Example 2

Ceramic Precursor Formulation An exemplary plasticized ceramic precursor batch composition, shown in Table 2, comprising the ammonium salt of methylcellulose binder prepared from the above procedure was formulated. Typical mixing procedures in a mixer and twin screw extruder includes the steps:

mixing methylcellulose and stearic acid lubricant with all inorganic ingredients in a Littleford mixer for about 5 minutes;

injecting water into Littleford while mixing for about 1 to about 2 minutes;

injecting a derivatized polyalphaolefin oil lubricant (e.g., Durasyn®) and tall oil into a Littleford mixer while mixing for about 1 to about 2 minutes; and feeding the moist batch into an extruder.

Comparative Example 3

Extrusion of Ceramic Precursor Formulation—Extrusion Pressure Variability Reduction Die pressure is a significant parameter for an operator/producer to monitor/control to ensure the quality and productivity of the extruded honeycomb. A change in die pressure can result in a change in skin thickness, and often leads to skin or web defects, such as sworn web or fast flow skin. Ceramic batches containing each of four lots (#1 to #4) of the sodium salt of methylcellulose were extruded through a honeycomb die. The Na content of the methylcellulose (free and bound) ranged from about 800 to about 3,600 ppm. The mean die pressure for four lots of commercially available methylcellulose was 1,506 psi while standard deviation was 209 psi.

Example 4

Extrusion of Ceramic Precursor Formulation—Extrusion Pressure Variability Reduction Comparative Example 3 was repeated with the exception that the methylcellulose selected was from the four ammonium ion-exchange lots (#5 to #8) having a Na content (total free and bound) of from about 120 to about 1,400 ppm. The extrusion yielded stable pressure throughout the run for all the conditions and the honeycomb parts had excellent quality. The mean die pressure for the four lots having an ammonium salt of methylcellulose was about 1,657 psi and the standard deviation was about 108 psi. A comparison with the conditions and products in Comparative Example 3 showed that the standard deviation of the die pressure for the ammonium salt of methylcellulose formulations was about 50% lower than that of the commercially available methylcellulose formulations, in addition to a significant improvement in honeycomb quality and product consistency.

The disclosure has been described with reference to various specific embodiments and techniques. However, many variations and modifications are possible while remaining within the spirit and scope of the disclosure.

REFERENCES

1. Methocel Cellulose Ethers Technical Handbook, Dow Chemical Co.
2. Sarkar, N., "Thermal gelation properties of methyl and hydroxypropyl methylcellulose," *J. Appl. Polym. Sci.*, 24, 1073-1087, (1979).
3. Sarkar, N., et al., "Methylcellulose Polymers as Multifunctional Processing Aids in Ceramics," *Ceramic Bulletin*, 62, 1280, (1983).
4. Li, L et al., *Langmuir*, 18, 7291-7298 (2002).
5. Schuetz, J. E., "Methylcellulose Polymers as Binders for Extrusion of Ceramics," *Ceramic Bulletin*, 65, 1556, (1986).

What is claimed is:

1. A method for making a ceramic precursor honeycomb green body, the method comprising:
    mixing inorganic ceramic-forming ingredients to form a batch;
    adding to the batch and further mixing a mixture of an organic binder comprising an ammonium salt of an alkylated cellulose and a liquid vehicle, to form a plasticized mixture; and
    extruding and drying the plasticized mixture to form the honeycomb green body.

2. The method of claim 1 wherein the ammonium salt of an alkylated cellulose comprises an ammonium alkylcellulose.

3. The method of claim 1 wherein the alkyl of the alkylated cellulose comprises at least one of methyl, ethyl, propyl, butyl, or mixtures thereof.

4. The method of claim 1 wherein the ammonium salt of an alkylated cellulose comprises an ammonium cation selected from the group of $NR^1_4{}^+$, or mixtures thereof, where each $R^1$ is independently selected from —H, or a linear or branched —$(C_{1-4})$alkyl.

5. The method of claim 1 wherein the organic binder comprises less than about 500 ppm total sodium ion.

6. The method of claim 1 wherein the organic binder is present in the plasticized mixture in an amount of from about 0.6 to about 6 weight percent and the liquid vehicle is present in an amount of from about 16 to about 50 weight percent based on the total weight of the plasticized mixture.

7. The method of claim 1 wherein the inorganic ceramic-forming ingredients further include a pore former comprising a mixture of graphite and starch.

8. The method of claim 1 further comprising firing the green body to produce a predominant ceramic phase.

9. The method of claim 8 wherein the predominant ceramic phase is aluminum titanate.

* * * * *